(12) United States Patent
Iida

(10) Patent No.: US 7,254,419 B2
(45) Date of Patent: Aug. 7, 2007

(54) TONE GENERATION SYSTEM, COMMUNICATION TERMINAL AND TONE GENERATOR MODULE

(75) Inventor: Toshiya Iida, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 86 days.

(21) Appl. No.: 10/443,562

(22) Filed: May 22, 2003

(65) Prior Publication Data

US 2003/0220090 A1 Nov. 27, 2003

(30) Foreign Application Priority Data

May 27, 2002 (JP) .............................. 2002-153032

(51) Int. Cl.
*H04M 1/00* (2006.01)

(52) U.S. Cl. ..................... 455/567; 455/418; 455/41.2; 455/69; 455/569.1; 455/550; 455/568

(58) Field of Classification Search ................ 455/567, 455/418, 41.2, 69, 569.1, 575.6; 700/94; 84/609, 615
See application file for complete search history.

(56) References Cited

U.S. PATENT DOCUMENTS

| | | | |
|---|---|---|---|
| 6,088,733 A | | 7/2000 | Kikuchi |
| 6,835,884 B2 * | | 12/2004 | Iwamoto et al. ............... 84/609 |
| 2001/0007960 A1 * | | 7/2001 | Yoshihara et al. ............ 700/94 |
| 2001/0014616 A1 * | | 8/2001 | Matsuda et al. ............ 455/567 |
| 2002/0132585 A1 * | | 9/2002 | Palermo et al. ................ 455/41 |
| 2003/0073460 A1 * | | 4/2003 | van Pelt et al. ............ 455/556 |

FOREIGN PATENT DOCUMENTS

| | | |
|---|---|---|
| JP | 09-034455 | 2/1997 |
| JP | 9-281961 | 10/1997 |
| JP | 10-319950 | 12/1998 |
| JP | 11-112615 | 4/1999 |
| JP | 2003-29747 A | 1/2003 |

OTHER PUBLICATIONS

Japanese Patent Office, "Office Action," (May 16, 2006).

* cited by examiner

*Primary Examiner*—Joseph Feild
*Assistant Examiner*—Randy Peaches
(74) *Attorney, Agent, or Firm*—Pillsbury Winthrop Shaw Pittman LLP

(57) ABSTRACT

A plurality of operators provided on a communication terminal, such as a portable phone, are assigned in advance to functions for generating tones, and a tone generation starting signal is generated in response to depressing operation, by a user, of any one of the operators. The communication terminal transmits, to a tone generator module, performance content data having added thereto operation time information representative of a time when the user's depressing operation has taken place. Upon receipt of the performance content data from the communication terminal, the tone generator module carries out a process based on the tone generation starting signal on the basis of the operation time information added to the performance content data.

18 Claims, 6 Drawing Sheets

| OPERATOR | MIDI DATA TO BE CREATED |
|---|---|
| NUMERICAL CHARACTER KEY "1" | NOTE – ON OF NOTE "C" |
| NUMERICAL CHARACTER KEY "2" | NOTE – ON OF NOTE "C # (D♭)" |
| NUMERICAL CHARACTER KEY "3" | NOTE – ON OF NOTE "D" |
|  |  |

TONE GENERATION SYSTEM, COMMUNICATION TERMINAL AND TONE GENERATOR MODULE

BACKGROUND OF THE INVENTION

The present invention relates generally to systems for generating tones using communication terminals, such as portable communication terminals, and tone generator modules.

In view of recent trends toward higher performance and functionality of communication terminals, such as portable (handportable) phones, there have been proposed various usage or additional functions other than their primary telephone functions. One example of the proposed additional functions is to use the communication terminal to generate musical tones. Among the proposed techniques for generating tones using the communication terminal is one in accordance with which tones are generated, in response to user's operation of keys on the communication terminal, via a tone generator circuit provided within the communication terminal. According to another one of the proposed techniques, a terminal operation device including performance operators is connected to a communication network via a portable communication terminal, so that tones are generated by remote-controlling an electronic musical instrument also connected to the communication network.

However, none of the conventionally-proposed techniques can readily generate and perform tones of high musical quality. Namely, with the technique for generating tones by the communication terminal itself, generated tones tend to be of poor musical quality because the tone generator circuit provided within the communication terminal is unavoidably limited to a simple structure. Further, with the technique for remote-controlling the electronic musical instrument, the user can not easily enjoy a musical instrument performance, because the extra operation terminal device including performance operators is required. Also, because the communication via the network requires a predetermined time, it would take a long time before the electronic musical instrument can actually generate tones after user's operation on the terminal device, so that a real-time performance is difficult to achieve.

SUMMARY OF THE INVENTION

In view of the foregoing, it is an object of the present invention to provide a novel tone generation system which can generate tones of high musical quality and easily execute a real-time performance using a general-purpose communication terminal such as a portable phone.

In order to accomplish the above-mentioned object, the present invention provides a tone generation system which comprises a communication terminal including an operator and capable of carrying out communication via a communication network, and a tone generator module. In the tone generation system of the present invention, the communication terminal includes: a mode setting section that sets the operation mode of the communication terminal to either one of an ordinary mode for causing the communication terminal to operate as an ordinary communication terminal to carry out the communication via the communication network and a music mode for causing the communication terminal to operate as a control terminal to control the tone generator module; and a transmission section that, when the operator has been operated by a user of the communication terminal while the communication terminal is in the music mode set by the mode setting section in response to an instruction by the user, transmits, to the tone generator module, a performance signal including information representative of the content or purport of the operation, by the user, of the operator and operation time information representative of the time when the operation, by the user, of the operator has taken place. Also, in the tone generation system of the present invention, the tone generator module includes a processing section that, when the performance signal transmitted by the communication terminal has been received, carries out, at timing based on the operation time information included in the performance signal, a process for tone generation based on the information representative of the purport of the operation of the operator included in the performance signal.

In the tone generation system thus arranged, when the operator has been operated by the user of the communication terminal while the communication terminal is in the music mode set by the mode setting section in response to an instruction given by the user, the transmission section transmits, to the tone generator module, a performance signal including information representative of the purport of the operation, by the user, of the operator and operation time information representative of the time when the user's operation of the operator has taken place. The tone generator module, having received the performance signal from the communication terminal, carries out the process for tone generation based on the information representative of the purport of the operation, at timing based on the operation time information. Namely, the process for tone generation based on the information representative of the purport of the user's operation is carried out at timing corresponding to the time of the user's operation of the operator.

The transmission section of the communication terminal may transmit, to the tone generator module, the performance signal imparted with reference number information generated in such a manner as to have predetermined regularity (regular characteristic) with respect to the reference number information of a previous performance signal transmitted thereby. In this case, when the reference number information of the performance signal received from the communication terminal fails to satisfy the predetermined regularity, the processing section of the tone generator module may cease current sounding of a tone.

Namely, once it has been detected that the reference number information of the performance signal received by the tone generator module does not satisfy predetermined regularity, the tone generator module deadens or silences a tone being currently generated therefrom. Thus, even when the performance signal could not be appropriately transmitted from the communication terminal to the tone generator module due to some reason, it is possible to reliably avoid a situation where a tone is undesirably left sounding from the tone generator module.

Further, when the transmission section of the communication terminal has failed in transmission of the performance signal to the tone generator module, it may be allowed to re-transmit the same performance signal to the tone generator module within a predetermined retry period, and, in case the performance signal can not be transmitted to the tone generator module even within the predetermined retry period, the transmission section may discard the performance signal.

Further, the processing section of the tone generator module may carry out the process for tone generation based on the information representative of the purport of the operation included in the performance signal, at timing a predetermined time after the time represented by the operation time information included in the performance signal.

Preferably, the above-mentioned predetermined time is longer than the predetermined retry period.

Further, the communication terminal and the tone generator module may communicate with each other through short-range wireless communication. Alternatively, the communication terminal and the tone generator module may communicate with each other through communication based on the Bluetooth standard, in which case the transmission section of the communication terminal may generate the operation time information on the basis of clock signals that are generated for communication based on the Bluetooth standard.

According to another aspect of the present invention, there is provided a communication terminal having a plurality of operators, which comprises: a mode setting section that sets the operation mode of the communication terminal to either one of an ordinary mode for causing the communication terminal to operate as an ordinary communication terminal to carry out communication via a communication network and a music mode for causing the communication terminal to operate as a control terminal to control a tone generator module; and a transmission section that, when any one of the operators has been operated by a user while the communication terminal is in the music mode set by the mode setting section in response to an instruction by the user, transmits, to the tone generator module, a performance signal including information representative of the purport of the operation, by the user, of the operator and operation time information representative of the time when the operation, by the user, of the operator has taken place.

The transmission section of the communication terminal may transmit, to the tone generator module, the performance signal imparted with reference number information generated in such a manner as to have predetermined regularity with respect to the reference number information of a previous performance signal transmitted thereby. Further, when the transmission section of the communication terminal has failed in transmission of the performance signal to the tone generator module, it may be allowed to re-transmit the performance signal to the tone generator module within a predetermined retry period, and, when the performance signal can not be transmitted to the tone generator module even within the predetermined retry period, the transmission section may discard the performance signal.

According to another aspect of the present invention, there is provided a tone generator module which comprises: a reception section that, when an operator of an external communication terminal has been operated by a user of the communication terminal, receives a performance signal output from the communication terminal, the performance signal including information representative of the purport of the operation, by the user, of the operator and operation time information representative of the time when the operation, by the user, the operator has taken place; and a processing section that, at timing based on the operation time information included in the performance signal, carries out a process for tone generation based on the information representative of the purport of the operation of the operator included in the performance signal.

The tone generator module arranged as above can receive, from the communication terminal, the performance signal including information representative of the purport of the operation, by the user, of the operator and operation time information representative of the time when the user's operation of the operator has taken place. Then, at timing based on the operation time information included in the performance signal, the tone generator module carries out the process for tone generation based on the information representative of the purport of the operation of the operator included in the performance signal. Namely, the process for tone generation based on the information representative of the purport of the user's operation is carried out at timing corresponding to the time of the user's operation. The processing section of the tone generator module may carry out the process for tone generation based on the information representative of the purport of the operation included in the performance signal, at timing a predetermined time after the time represented by the operation time information included in the performance signal. Further, in the case where the performance signal is imparted with reference number information generated in such a manner as to have predetermined regularity with respect to the reference number information of a previous performance signal transmitted thereby, and once it has been detected that the reference number information of the performance signal received by the tone generator module does not satisfy predetermined regularity, the tone generator module ceases a tone being currently generated therefrom.

The following will describe embodiments of the present invention, but it should be appreciated that the present invention is not limited to the described embodiments and various modifications of the invention are possible without departing from the basic principles of the invention. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

DETAILED DESCRIPTION OF THE INVENTION

Figure 1:
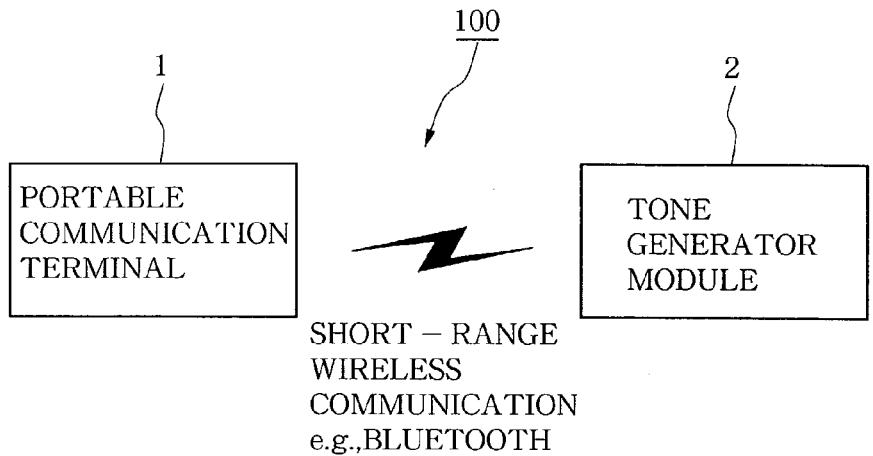
FIG. 1 is a block diagram showing a tone generation system in accordance with en embodiment of the present invention.

A. Construction:

FIG. 1 is a block diagram showing a tone generation system 100 in accordance with en embodiment of the present invention, which includes a portable communication terminal 1, such as a portable phone, and a tone generator module 2. The portable communication terminal 1 and tone generator module 2 are positioned a short distance (several meters) from each other, and data communication can be performed via predetermined short-range wireless communication facilities, such as one using the Bluetooth (registered trademark) standard.

Figure 2:
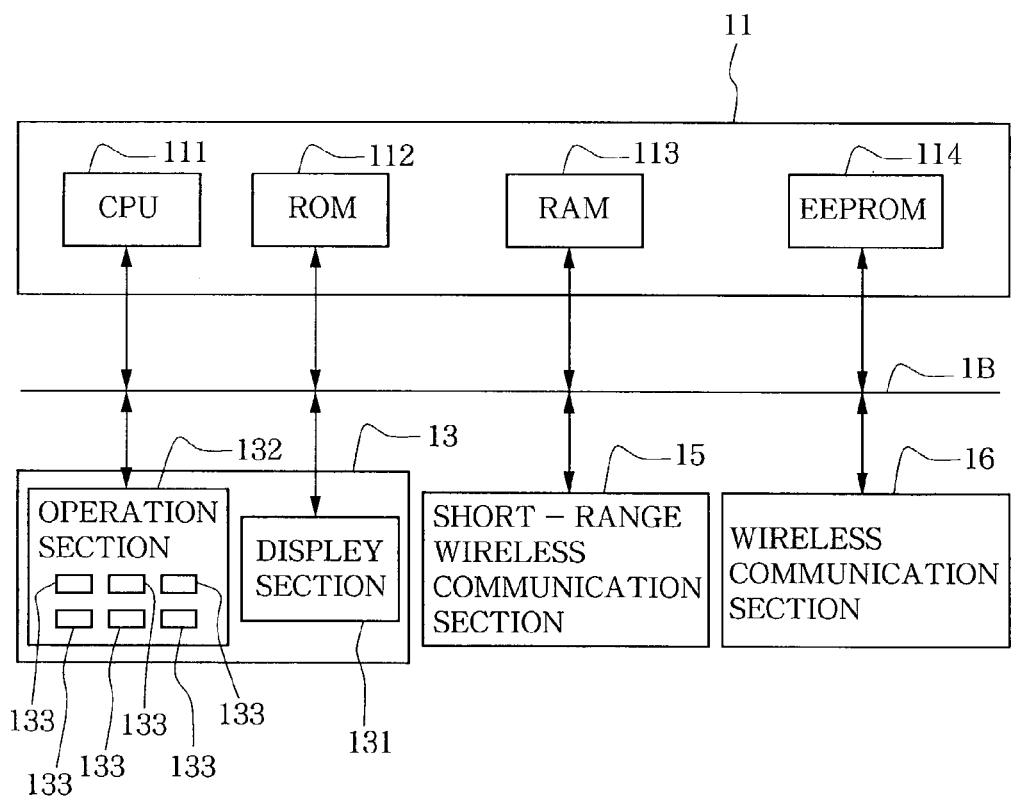
FIG. 2 is a block diagram showing an example general setup of a portable communication terminal employed in the tone generation system of FIG. 1.

FIG. 2 is a block diagram showing a general setup of the portable communication terminal 1. As shown, the portable communication terminal 1 includes a control section 11, a user interface section 13, a short-range wireless communication section 15 and a wireless communication section 16, and these sections 11, 13, 15 and 16 are interconnected via a bus 1B.

The control section 11, which includes a CPU 111, a ROM (Read-Only Memory) 112, a RAM (Random Access Memory) 113 and an EEPROM (Electrically Erasable Programmable Read-Only Memory) 114, controls operation of the individual components of the portable communication terminal 1. In the EEPROM 114, there are prestored various control programs to be executed in the tone generation system 100. The CPU 111 has a time keeping function to indicate a changing current time, a counter function and a timer function.

The wireless communication section 16 executes wireless communication with a base station of a mobile communication network, under control of the control section 11, to communicate data (telephone conversations) with another portable communication terminal 1 via the mobile communication network. Such a telephone conversation communicating function is the primary function of the portable communication terminal 1 not directly pertinent to the features of the tone generation system 100 of the present invention and therefore will not be described here.

The short-range wireless communication section 15 performs short-range wireless communication with the tone generator module 2 under control of the control section 11. The user interface section 13 includes a display section 131 for visually displaying various pieces of information, and an input operation section 132 for the user to input desired data or instructions. On the input operation section 132, there are provided a plurality of operators 133, such as a cursor key and character keys.

The portable communication terminal 1 can operate in either one of two operation modes. Specifically, in accordance with an instruction by the user, the portable communication terminal 1 operates in either an "ordinary mode" in which the terminal 1 is operates in a similar manner to the conventional portable pones or a "music mode" in which the terminal 1 controls the tone generator module 2 of the tone generation system 100.

When the user does not give any instruction as regards the operation mode, the portable communication terminal 1 operates in the ordinary mode that is a default operation mode, in which the terminal 1 performs communication with another portable communication terminal 1 via the mobile communication network, etc. In the ordinary mode, the operators 133 function as means for inputting a telephone number, address information and/or the like as in the conventional portable phones. Once the user has performed predetermined operation to switch the operation mode from the ordinary mode over to the music mode, the portable communication terminal 1 switches to the music mode, in which the user of the terminal 1 is allowed to use the tone generation system 100, i.e. control the tone generator 2. In the music mode, the operators 133 function as means for designating tones to be generated by the tone generator 2.

Functions to be performed by the operators 133 in each of the operation modes are prestored in the EEPROM 114.

Figures 3, 4:
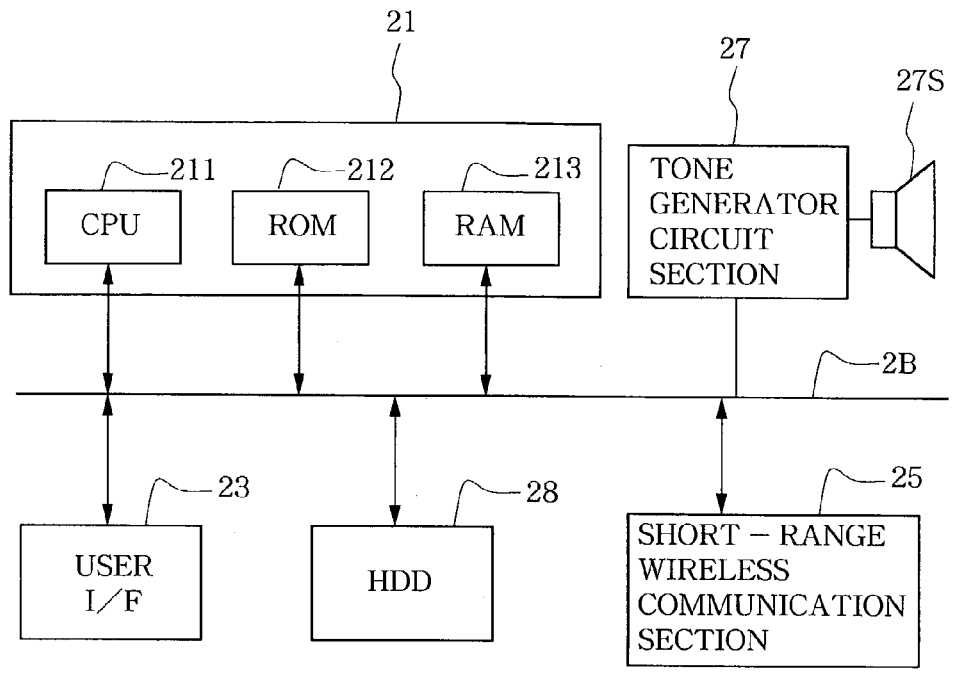
FIG. 3 is a block diagram showing an example general setup of a tone generator module employed in the tone generation system of FIG. 1.
FIG. 4 is a diagram explanatory of a table defining correspondency between a plurality of operators provided on the portable communication terminal and MIDI data to be created in response to operation of the operators.

The following paragraphs describe a setup of the tone generator module 2. FIG. 3 is a block diagram showing an example general setup of the tone generator module 2. The tone generator module 2 includes a control section 21, an user interface section 23, a short-range wireless communication section 25, a tone generator circuit section 27 and an HDD (Hard Disk Drive) 28, and these components 21, 25, 27 and 28 are interconnected via a bus 2B. Speaker 27s is connected to the tone generator circuit section 27.

The control section 21 includes a CPU 211, a ROM 212 and a RAM 213, and it controls the various components of the tone generator module 2. On the HDD 28, there are prestored various control programs to be executed in the tone generation system 100. The CPU 211 has a time keeping function to indicate a changing current time. The short-range wireless communication section 25 performs short-range communication with the portable communication terminal 1 under control of the control section 21. The tone generator circuit section 27 generates tone signals in accordance with MIDI data supplied via the control section 21, and the thus-generated tone signals are audibly reproduced or sounded via the speaker 27s.

Note that the control programs of the tone generation system 100 can be built by JAVA (registered trademark), provided that the above-described portable communication terminal 1 and tone generator module 2 are under a JAVA-supporting environment. In such a case, the tone generation system 100 can be utilized with increased ease, because the control programs of the tone generation system 100 can be installed appropriately irrespective of the type or model of the portable communication terminal 1 etc.

B. Behavior:

Next, a description will be given about behavior of the tone generation system 100.

B1. Behavior of the Portable Communication Terminal 1:

As noted earlier, the portable communication terminal 1 can operate in either the "ordinary mode" selected when the user wants the terminal 1 to operate in a similar manner to the conventional portable pones or the "music mode" selected when the user wants to utilize the tone generation system 100. The behavior of the portable communication terminal 1 in the ordinary mode is similar to the behavior of the conventional portable phones and therefore will not be described here. The following paragraphs describe the behavior of the portable communication terminal 1 in the music mode where the tone generation system 100 is utilized.

Once the user performs predetermined operation on the portable communication terminal 1, the control section 11 of the terminal 1 starts up an application program that is stored in the EEPROM 114 for controlling the tone generator module 2, and it controls the various components of the communication terminal 1 in accordance with the application program. As the portable communication terminal 1 operates in accordance with the application program, the operation mode of the terminal 1 switches from the ordinary mode to the music mode.

Once the operation mode of the terminal 1 has switched to the music mode, the control section 11 first makes necessary preparations for short-range wireless communication with the tone generator module 2. Where the Bluetooth standard is used as a communication protocol in the tone generation system 100, the control section 11 transmits a communication request signal to the tone generator module 2 so that a network called "piconet" is formed. Once the piconet is formed, the portable communication terminal 1 is ready for transmission/reception of packet data created using a predetermined standard time unit of, for example, 625 μsec. Although any one of the terminal 1 and tone generator module 2 may be assigned or set as a master device, the instant embodiment will be described in relation to a case where the operation mode of the communication terminal 1 is set as a slave device while the tone generator module 2 is set as a master device.

The control section 11 causes the display section 131 to visually display a message to the effect that data communication with the tone generator module 2 is now ready to start, so as to inform the user of the portable communication terminal 1 that he or she can now use the tone generation system 100.

Then, once the user depresses any of the operators 133 while the portable communication terminal 1 is operating in the music mode, the control section 11 creates MIDI data corresponding to the depressed operator 133. In the instant embodiment, the EEPROM 114 has prestored therein a table defining MIDI data to be created in response to operation of the various operators 133, as illustrated in FIG. 4.

Figure 5:
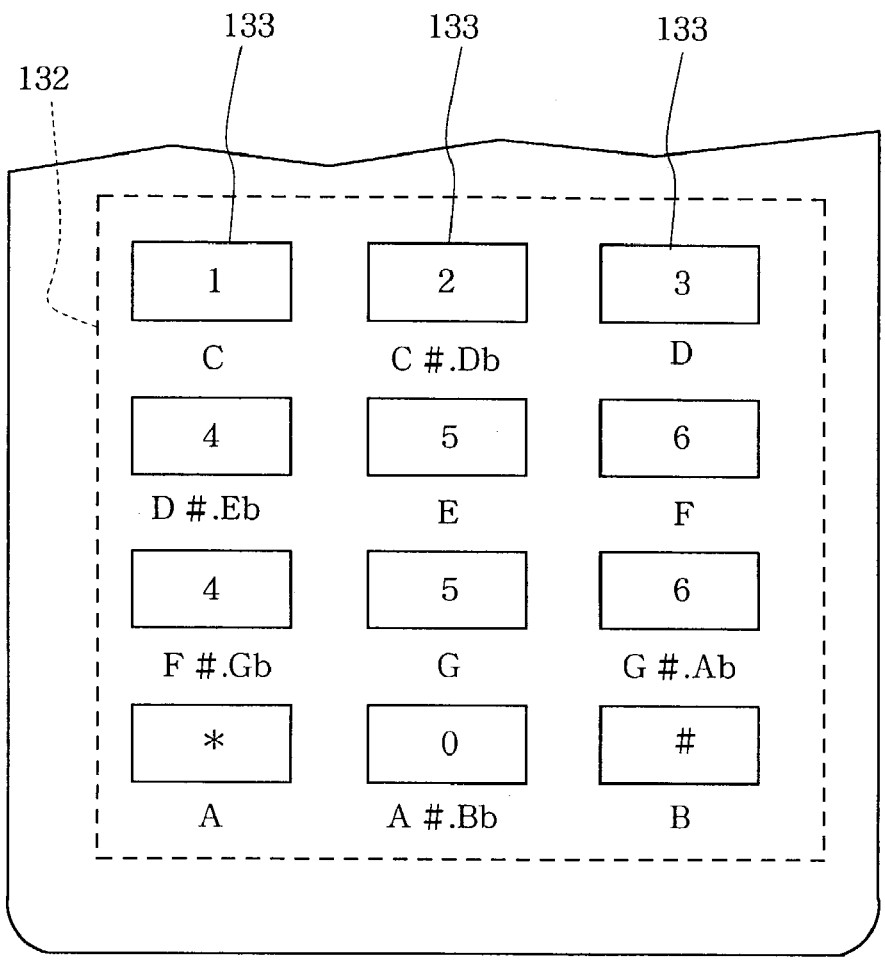
FIG. 5 is an outer appearance view of an operation section of the portable communication terminal.

FIG. 5 is a view showing an example outer appearance of the operation section 132 of the portable communication terminal 1. Specifically, FIG. 5 shows an example of the operation section 132 where functions of the operators 133 when the terminal 1 is used in the ordinary mode and functions of the operators 133 (i.e., information indicative of the types of tones to be generated in response to user's operation of the operators 133, i.e. the meaning or purport of user's operation of the operators 133) when the terminal 1 is used in the music mode are indicated close to the respective operators 133.

The following paragraphs describe details of control performed by the control section 11 of the portable communication terminal 1.

Once the user depresses numerical character key "1" that is one of the operators 133, the control section 11 generates a tone generation starting signal (note-on signal) for note "C" corresponding to numerical character key "1", in accordance with the table (see FIG. 4) stored in the EEPROM 114. Then, once the user terminates the depression of numerical character key "1", the control section 11 generates a tone generation ending signal (note-off signal) for note "C". Namely, in response to a succession of user's depression and release operation of numerical character key "1", tone generation staring and ending signals (note-on and note-off signals) for note "C" are generated by the control section 11. The control section 11 performs similar operations when any other one of the operators 133 is depressed by the user, so that MIDI data is generated in accordance with the function of the depressed operator 133, i.e. the purport of the user's operation of the operator 133.

After that, the control section 11 generates performance content data by imparting predetermined header data to the generated MIDI data.

Figure 6:
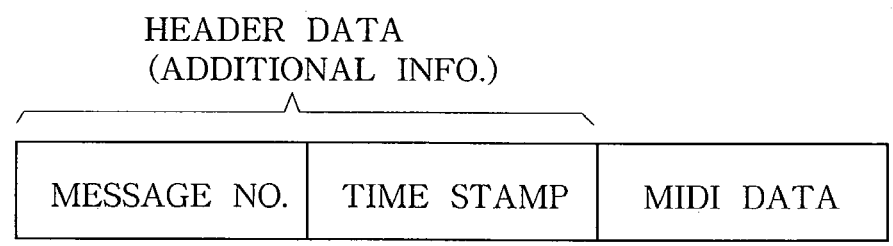
FIG. 6 is a diagram conceptually showing performance content data generated by a control section of the portable communication terminal.

FIG. 6 is a diagram conceptually showing an example format of the performance content data generated by the control section 11. As shown, the header data is additional information including message number information and time stamp information.

The message number information represents a serial number allotted to the MIDI data generated by the control section 11. Namely, each time the control section 11 generates MIDI data on the basis of user operation of any of the operators 133, it imparts a serial number (e.g., "1", "2", "3", . . . ) to the generated MIDI data. Thus, the message number of given performance content data has predetermined regularity with respect to the message number of preceding performance content data. Such message numbers (serial numbers) are managed using the counter function of the CPU 111.

The time stamp information is indicative of the time when the MIDI data has been generated on the basis of the user operation, to which is added operation time information indicative of the time when the user's operation of any of the operators 133 has taken place. The operation time information can be obtained by the time keeping information of the CPU 111. The control section 11 outputs the thus-generated performance content data to the short-range wireless communication section 15.

The short-range wireless communication section 15 converts the performance content data, supplied from the control section 11, into a predetermined radio (wireless) signal and transmits the converted radio signal to the tone generator module 2. In the case where the communication is performed through the Bluetooth standard, the performance content data is converted into predetermined packet data and then transmitted to the tone generator module 2 at each predetermined time slot timing (e.g., every 626 μsec.) Generally, in the case where wireless communication is performed, performance content data can not always be transmitted appropriately every predetermined timing, and thus it has been conventional to perform control such that, when transmission of given performance content data failed, the same data is re-transmitted on one or more occasions subsequent to the predetermined transmitting occasion. However, if such data re-transmission is allowed limitlessly, there would arise an adverse influence even preventing subsequent performance content data from being transmitted properly. Therefore, in the instant embodiment, a time-out process is carried out to permit re-transmission of same performance content data only within a predetermined retry time period T1, e.g. 5 msec.

Figure 7:
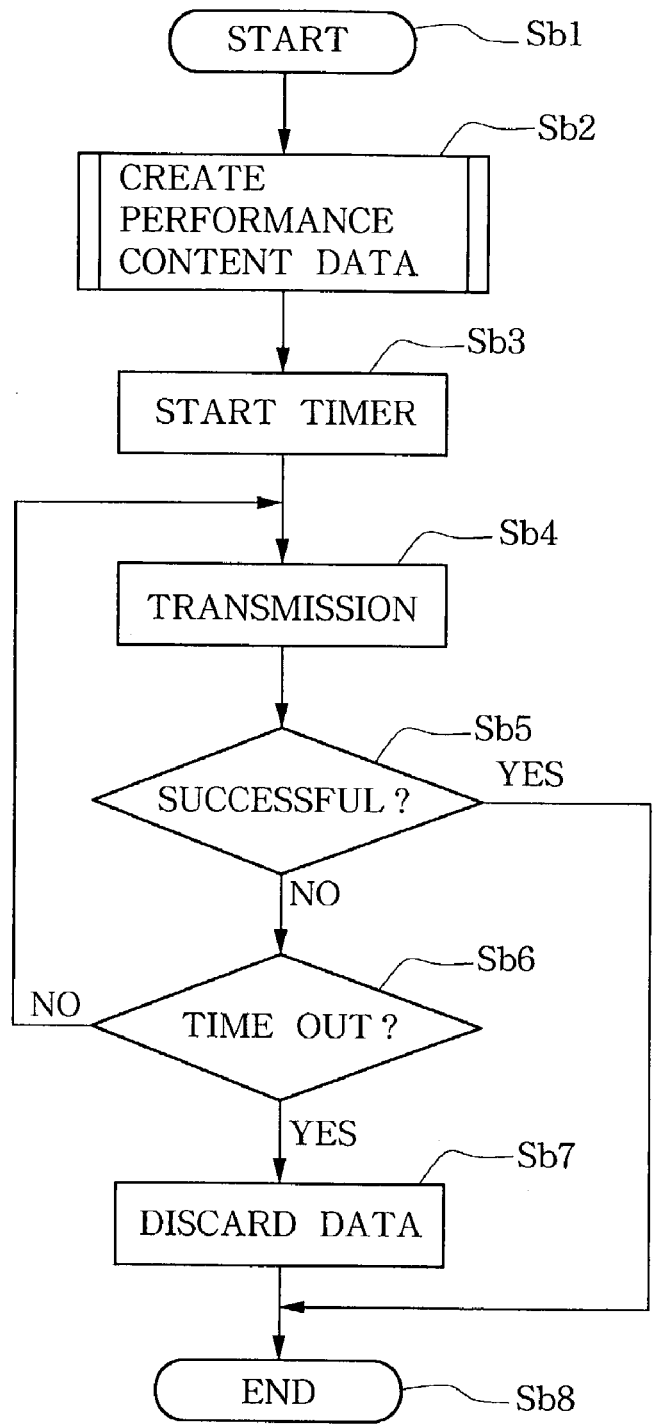
FIG. 7 is a flow chart of a time-out process carried out by the control section of the portable communication terminal.

FIG. 7 is a flow chart of the time-out process carried out by the control section 11. Once the control section 11 has created performance content data at step Sb2, it starts the timer function of the CPU 111 at step Sb3. Then, at step Sb4, the control section 11 outputs the created performance content data to the short-range wireless communication section 15 and instructs the communication section 15 to transmits the performance content data to the tone generator module 2. If the performance content data could not be transmitted successfully as determined at step Sb5, the control section 11 reverts to step Sb4 to cause the same performance content data to be transmitted again via the short-range wireless communication section 15, provided that the current count of the timer is not greater than a predetermined value corresponding to the predetermined retry time period T1 as determined at step Sb6 (NO determination at step Sb6).

Namely, before a lapse of the predetermined retry time period T1, the control section 11 enhances reliability of the performance content data transmission by trying the re-transmission of the same performance content data over the predetermined retry time period T1. However, after a lapse of the predetermined retry time period T1, the control section 11 inhibits the re-transmission of the same performance content data, so as to avoid the adverse influence preventing transmission of subsequent performance content data. By thus executing the time-out process, the control section 11 discards any performance content data that could not be successfully transmitted to the tone generator module 2 even within the retry time period T1, at step Sb7.

Figure 8:
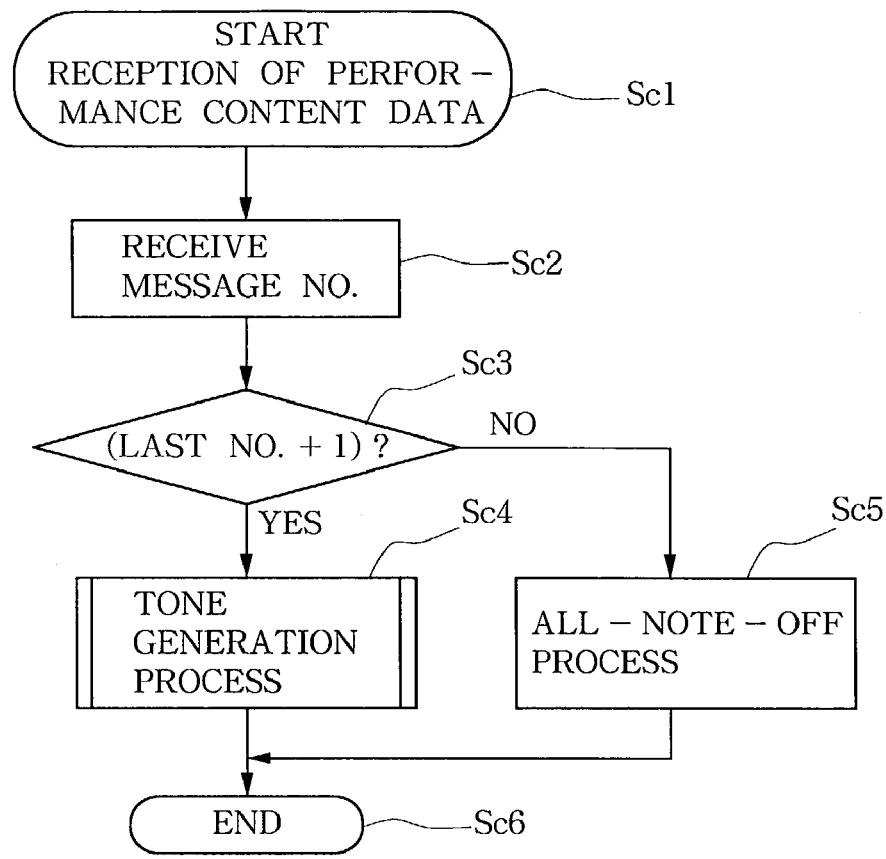
FIG. 8 is a flow chart of a process performed by a control section of the tone generator module when the performance content data has been received from the portable communication terminal.

B2. Behavior of the Tone Generator Module 2:

The following paragraphs describe the behavior of the tone generator module 2, with primary reference to FIG. 8. FIG. 8 is a flow chart of a process performed by the control section 21 of the tone generator module 2 when the performance content data has been received from the portable communication terminal 1.

Upon receipt of the performance content data at step Sc1, the control section 21 identifies a value of the message number included in the header data of the currently-received performance content data at step Sc2, and it is determined at step Sc3 whether the current message number is consecutive to a last or preceding message number, i.e. whether or not the current message number satisfies predetermined regularity with respect to the message number of the last-received performance content data.

As noted above, the control section 11 of the portable communication terminal 1 imparts individual created MIDI data with serial message numbers in the order the MIDI data have been created. Thus, normally, the individual created MIDI data are transmitted sequentially from the portable communication terminal 1 to the tone generator module 2 in accordance with the order represented by the message numbers.

However, when the above-described time-out process has been performed for some reason, there may arise a situation where performance content data of a certain message number is not appropriately received by the tone generator module 2, which may result in discreteness or inconsecutiveness of the message numbers. Namely, in such a case, the tone generator module 2 can not actually receive, from the portable communication terminal 1, MIDI data that should be received. For example, an unusual situation may occur where the tone generator module 2 receives only a note-on signal of a given tone without receiving a corresponding note-off signal of the given tone in such a manner that the given tone is undesirably left sounding without being appropriately silenced.

Therefore, the instant tone generation system 100 is constructed so that, once discreteness or inconsecutiveness of the message numbers has been detected, the control section 21 carries out a process for ceasing sounding of all tones (all note-off process) at step Sc5.

If, on the other hand, the message number of the current received performance content data is consecutive to the preceding message number as determined at step Sc3, a tone generation process is executed which corresponds to the MIDI data of the current performance content data, at step Sc4.

Figure 9:
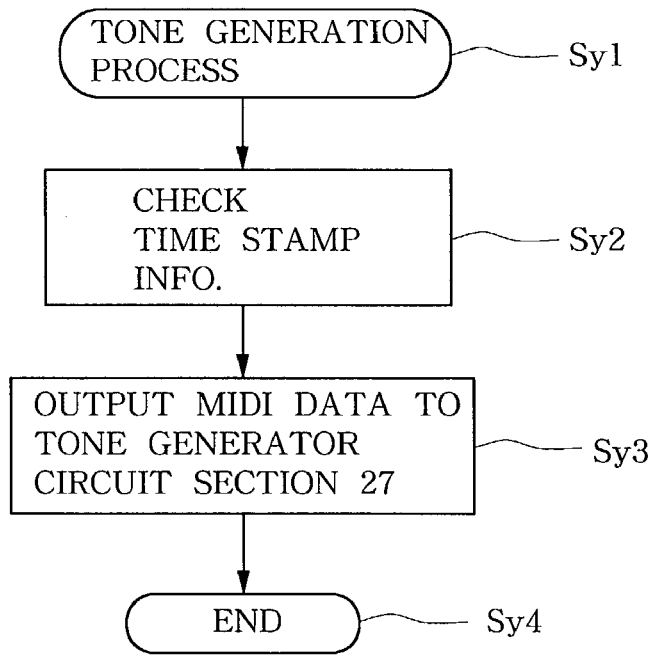
FIG. 9 is a flow chart of a tone generation process carried out by the control section of the tone generator module.

FIG. 9 is a flow chart of the tone generation process carried out by the control section 21 of the tone generator module 2.

First, at step Sy2, the control section 21 identifies the contents of the time stamp information included in the received performance content data. Then, at step Sy3, the control section 21 compares the time represented by the time stamp information and the current time, and supplies the tone generator circuit section 27 with the MIDI data of the current performance content data a predetermined time (e.g., 10 msec.) after the time represented by the time stamp information. Here, the predetermined time is of a value determined in advance within such a range that will not give a feel of a timing delay to the auditory sense of the user. The current time can be obtained from the CPU 211.

Let it be assumed that, according to the instant tone generation system 100, the operation time information used in the portable communication terminal 1 and the operation time information used in the tone generator module 2 is synchronized by Network Time Protocol (NTP: IETF RFC) or any means equivalent thereto to indicate a same time value.

After that, the tone generator circuit section 27 generates a tone signal at given timing on the basis of the MIDI data supplied from the control section 21. The thus-generated tone signal is audibly reproduced via the speaker 27s.

Namely, upon receipt of the performance content data, the control section 21 supplies the tone generator circuit section 27 with the MIDI data of the current performance content data, at timing the predetermined time T2 (e.g., 10 msec.) after the time represented by the time stamp information (i.e., time of the user operation), irrespective of the time when the performance content data has been received. Then, the tone generator circuit section 27 generates a tone signal based on the MIDI data and audibly reproduced via the speaker 27s.

Thus, even when some cause (e.g., synchronization problem caused in the Bluetooth-based communication) has delayed data transmission from the portable communication terminal 1 to the tone generator module 2, the control section 21 executes the operation for outputting the MIDI data to the tone generator circuit section 27, irrespective of the reception time of performance content data, on the basis of the time represented by the time stamp information; thus, it is possible to avoid the situation where the tone generation process to be performed for a given one of MIDI data is undesirably delayed.

It has been empirically ascertained that, if sounding of a given one of successive tones is delayed, there would occur a kind of incompatibility to the auditory sense of the user. However, in the tone generation system 100, such incompatibility can be effectively avoided, because the control is performed, to uniformly defer sounding of every MIDI data by the predetermined time (e.g., 10 msec.).

In the instant embodiment, because the predetermined time T1 over which the time-out process is to be executed in the portable communication terminal 1 is set to 5 msec., any performance content data, having been delayed more than 5 msec. behind the time represented by the time stamp information, is prevented from being transmitted from the portable communication terminal 1 to the tone generator module 2. Namely, every performance content data, having been successfully transmitted from the portable communication terminal 1 to the tone generator module 2, is subjected to the tone generation operation by the tone generator circuit section 27 at uniform timing that is the predetermined time T2 (10 msec.) after the time represented by its time stamp information. To that end, the time-out period T1 over which the time-out process is to be executed in the portable communication terminal 1 may be set to another value than the above-mentioned, as long as the time-out period T1 is shorter than the above-mentioned delay time T2 in the tone generator circuit section 27.

For example, the time-out period T1 over which the time-out process is to be executed may be set freely by the user, in which case it is preferable that the delay time T2 in the tone generator circuit section 27 be increased or decreased in accordance with the setting of the time-out period T1. In such a case, if the user is skilled in performance operation, the time-out period T1 may be made shorter, with a view to reducing the delay time T2 in the tone generator circuit section 27 and thereby enhancing performance response. Namely, the time-out process period T1 may be set in accordance with the user's skill in performance operation.

Further, when the time-out process has not been required for more than a predetermined time (e.g., 30 sec.) since the user initiated a series of performance operation, a process may be performed to automatically make the time-out process period T1 shorter. Furthermore, the setting of the time-out process period T1 may be changed automatically or manually by the user in accordance with states of use of the tone generation system 100. For example, in a case where a great number of performance content data have to be processed at a time, e.g. because a number of performers (portable communication terminals 1) exist, the setting of the time-out process period T1 may be changed to be longer. Likewise, in areas of poor radio wave environments, the setting of the time-out process period T1 may be changed to be longer.

Moreover, there may be prepared in advance a predetermined test program for adjusting the time-out process period T1 prior to actual execution of a music piece performance. This approach is also effective in that it can set an appropriate value of the time-out process period T1 which corresponds to a performance level of the user.

For avoiding absence of data, the time-out process period T1 may be set at infinite value. In this case also, T2 should be set at a finite value and data received by the tone generator module 2 after the delay time T2 should be sounded immediately.

The above is contents of operation of the tone generator module 2.

As described above, the tone generation system 100 can generate tones of high musical quality using the operators 133 provided on the operation section 132 of the general-purpose portable communication terminal 1, without requiring dedicated operators. Namely, every interested user can use the conventional portable communication terminal 1 just as it is, and thus can readily utilize the tone generation system 100. Further, because the tone generator circuit section 27 of the tone generator module 2 is used for tone generation purposes, instead of the internal tone generator of the portable communication terminal 1 being used as with the conventionally-known techniques, the instant embodiment can avoid the problem that generated tones tend to have poor musical quality.

Further, because short-range wireless communication based on the Bluetooth standard or the like is used for communication between the portable communication terminal 1 and the tone generator module 2, the instant embodiment can generate tones substantially in real time in accordance with the type or purport of operation by the user.

C. Modifications:

The embodiment having been described above is merely for illustration purposes and may be modified optionally without departing from the basic concepts of the present invention. The following set forth some of various conceivable examples of modifications.

(Modification 1)

The above-described embodiment is constructed to deal with the individual operators 133 of the portable communication terminal 1 like keys of a piano keyboard, so as to generate a tone generation starting (note-on) signal of a predetermined tone in response to user's depression of any of the operators 133. As a modification, one or more predetermined ones of the operators 133 on the portable communication terminal 1 may be assigned to a function of shifting (raising or lowering) the pitch of a tone to be generated by the octave, with a view to expanding the available sounding pitch range.

Figure 10:
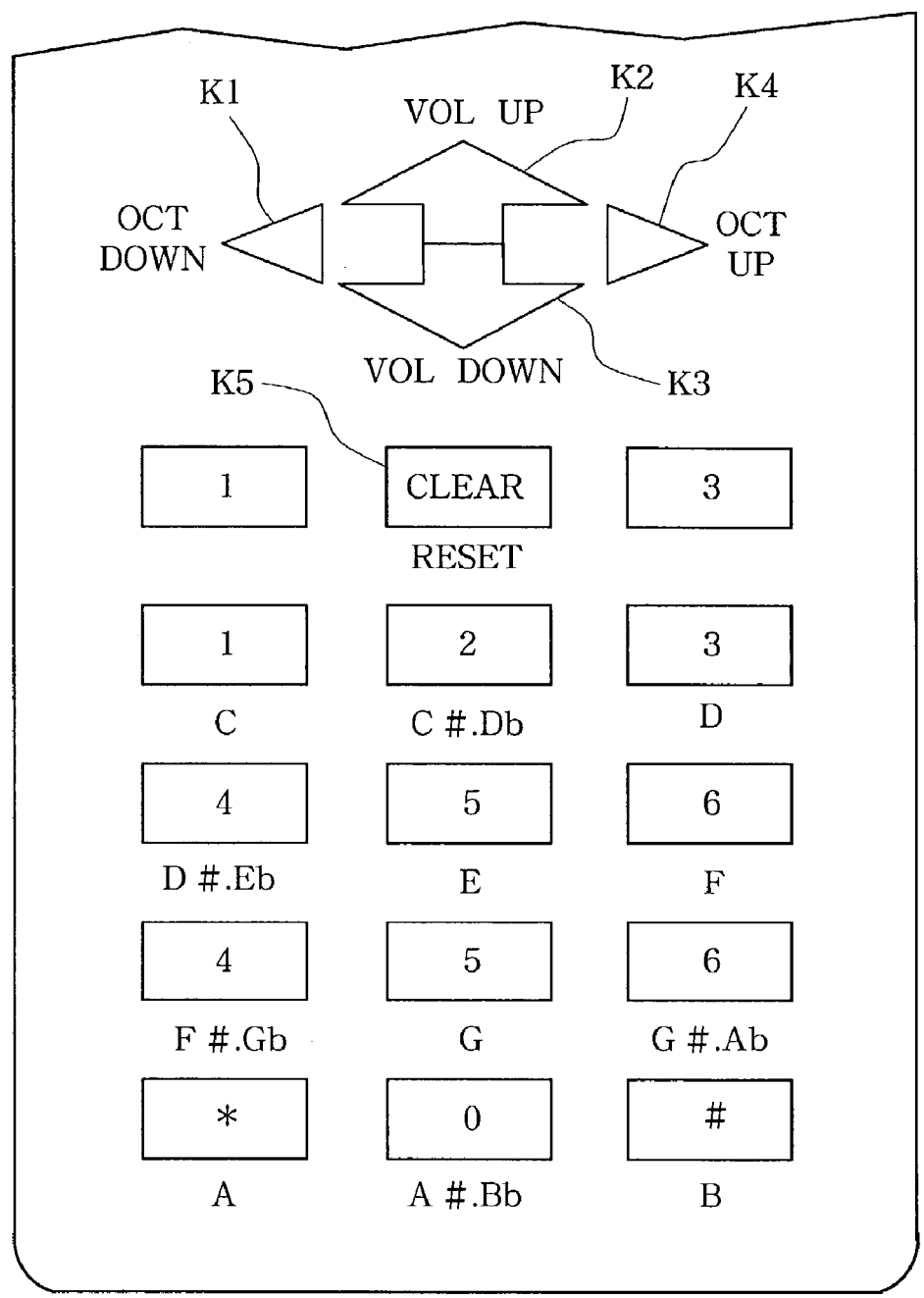
FIG. 10 is a view of showing an example outer appearance of the operation section of a modified portable communication terminal in the tone generation system.

FIG. 10 is a view of showing an example outer appearance of the operation section 132 of a modified portable communication terminal 1. As shown, the operation section 132 of the modified portable communication terminal 1 includes four directional cursor keys K1, K2, K3 and K4. In this case, the cursor key K1 may be used as an operator for instructing a one-octave-down pitch shift, and the cursor key K2 may be used as an operator for instructing a one-octave-up pitch shift. For example, when the user of the modified portable communication terminal 1 first depresses the cursor key K1 and then depresses numerical character key "1" instructing sounding of note "C", there is generated a tone generation starting (note-on) signal of note "C" one octave lower than the default octave position of note "C" corresponding to numerical character key "1". When the user of the modified portable communication terminal 1 depresses the cursor key K4 and then depresses numerical character key "2" instructing sounding of note "C#(D♭)", there is generated a tone generation starting (note-on) signal of note "C#(D♭)" one octave higher than the default octave position of note "C#(D♭)" corresponding to numerical character key "2".

By thus assigning the predetermined operators (cursor keys K1 and K4) to the functions of raising and lowering the pitch of a tone to be generated by the octave, the modification can effectively expand the sounding pitch range, as a result of which the modification can achieve a wider variety of performance expressions.

Further, a predetermined one of the operators 133 may be assigned to a function of instructing a reset to a default octave position. In the example of FIG. 10, the operator K5 is assigned to such a resetting function. Thus, once the user depresses the operator K5, an octave shifting (raising or lowering) instruction, having been executed so far, is canceled, so that the default octave position is restored.

Furthermore, of the four directional cursor keys K1-K4, one of the remaining cursor keys K2 may be assigned as an operator for instructing an increase in sounding volume level (volume-up control) while the other remaining cursor key K3 may be assigned as an operator for instructing a decrease in sounding volume level (volume-down control). In such a case, when the user of the modified portable communication terminal 1 depresses the cursor key K2 and then depresses numerical character key "1" instructing sounding of note "C", there is generated a tone generation starting (note-on) signal instructing tone generation of note "C" with a tone volume greater, by a predetermined level, than the default tone volume of note "C" corresponding to numerical character key "1". When the user of the modified portable communication terminal 1 depresses the cursor key K3 and then depresses numerical character key "2" instructing sounding of note "C#(D♭)", there is generated a tone generation starting (note-on) signal instructing sounding of note "C#(D♭)", there is generated a tone generation starting (note-on) signal instructing tone generation of note "C#(D♭)"

with a tone volume smaller, by a predetermined level, than the default tone volume of note "C#(D♭)" corresponding to numerical character key "2".

By thus assigning the predetermined operators (cursor keys K2 and K3) to the functions of raising and lowering the sounding volume, the modification can variously vary the sounding volume, as a result of which the modification can achieve a wider variety of performance expressions.

(Modification 2)

As another modification, arrangements may be made for creating another form of MIDI data than note-on and note-off signals. For example, there may be created, on the basis of operation by the user, a signal for designating a tone color of a tone to be generated, MIDI data for designating a special acoustic effect, etc.

This modification too can attain advantageous results similar to those attained by the above-described embodiment, by storing, in the EEPROM 114, a MIDI data creation table defining correspondency between the operators 133 and MIDI data to be created in response to operation, by the user, of the operators 133.

(Modification 3)

According to the above-described embodiment, the tone generation system 100 is constructed to obtain the operation time information using the time keeping functions of the CPUs 111 and 211 provided within the portable communication terminal 1 and tone generator module 2. In the case where the tone generation system 100 employs Bluetooth-based communication, at least either one of the portable communication terminal 1 and tone generator module 2 includes a clock signal generating circuit dedicated to the Bluetooth-based communication, so that the system 100 is placed in an environment where the clock signals can be shared between the portable communication terminal 1 and the tone generator module 2 upon formation of a communication network (piconet); however, both of the communication terminal 1 and tone generator module 2 may include respective clock signal generating circuits. Therefore, operation time information obtained by counting the clock signals may be used, instead of the time stamp information generated in the above-described embodiment. Namely, in the tone generation system 100, other operation time information than the current time information may be used, because advantageous results similar to those attained by the above-described embodiment can be accomplished as long as the contents of the time stamp information can be identified by the tone generator module 2.

(Modification 4)

The tone generation system 100 may include a plurality of portable communication terminals 1 without being restricted to just one portable communication terminal 1. According to the Bluetooth standard, up to seven slave devices (portable communication terminals 1) for one master device (tone generator module 2) can be provided as components of a piconet, and data transmission/reception can be performed through time-divisional communication. Thus, tone generation by the tone generator module 2 may be controlled using seven tone generator module 2, for example. In a case where the tone generator module 2 has a plurality of tone generation channels, control may be performed to allocate one portable communication terminal 1 to each of the tone generation channels so that a variety of performances can be executed; for example, a string quartet performance can be enjoyed using four portable communication terminals 1.

(Modification 5)

The embodiment of the tone generation system 100 has been described above as generating a tone in response to user depression of any one of the operators 133; however, a plurality of tones may be generated simultaneously in response to user depression of any one of the operators 133. For example, the basic C major chord may be sounded in response to user depression of a given operator 133.

This modification too can accomplish advantageous results similar to those attained by the above-described embodiment, by predefining correspondence between the operators 133 and tones to be generated in response to operation, by the user, of the operators 133.

(Modification 6)

As another modification, operation means other than the operators 133 may be used in the portable communication terminal 1. For example, if the portable communication terminal 1 is equipped with sound input means, such as a microphone, the user can input a sound to the microphone or input a percussive tone to the microphone by hitting the microphone. Then, a signal corresponding to the volume level of the input voice (or percussive sound) may be transmitted to the tone generator module 2, so as to adjust the output volume level from the tone generator module 2 in accordance with the transmitted signal. In the case where a percussive sound has been input by the user hitting the microphone, control may be performed such that a tone of a predetermined percussion instrument (such as a cymbal or castanets) can be output from the tone generator module 2.

(Modification 7)

Alternatively, in a case where an antenna associated with the short-range wireless communication section 15 is variable in length (expandable/contractable) as desired and electromagnetic wave intensity of a radio signal to be transmitted from the portable communication terminal 1 to the tone generator module 2 can be varied by expansion or contraction of the antenna, such an expandable/contractable antenna may be used as one of the operator means. Namely, with the arrangement that the output volume level from the tone generator module 2 is controlled in accordance with the electromagnetic wave intensity of the radio signal, the user can control the output volume level from the tone generator module by expanding or contracting the antenna.

Further, the electromagnetic wave intensity of the radio signal may be varied as the user puts the portable communication terminal 1 in or out of a pocket on his or her garment or grabs a portion of the antenna. In this case, control may be performed such that the tone generator module 2 can vary the tone volume in accordance with the variation in the electromagnetic wave intensity of the signal.

(Modification 8)

Whereas the embodiment of the inventive tone generation system 100 has been described above on the assumption that tone data handled in the system 100 are of the MIDI format, the tone data may be of any other suitable format. Particularly, any data format peculiar to the tone generation system 100 may be employed as long as the data are compliant with performance content data described above in relation to the embodiment (see FIG. 6) and constructed to specify tones to be generated and timing of the tones.

(Modification 9)

Whereas the embodiment of the inventive tone generation system 100 has been described above in relation to the case where Bluetooth-based communication is carried out between the portable communication terminal 1 and the tone generator module 2, any other suitable form of communication, such as infrared communication like one based on the IrDA (InfraRed Data Association) standard, may be performed between the communication terminal 1 and the tone generator module 2. Alternatively, the basic principles of the present invention may be applied to a system employing wired communication based on the USB (Universal Serial Bus), IEEE1394 (Institute of Electrical and Electronic Engineers 1394) or the like.

(Modification 10)

Whereas the embodiment of the inventive tone generation system 100 has been described above in relation to the case where the portable communication terminal 1 is a mobile communication terminal like a portable phone, the basic principles of the present invention may be applied where the portable communication terminal 1 is other than such a mobile communication terminal. For example, the portable communication terminal 1 may be a PDA (Personal Digital Assistant), a PC (Personal Computer), a wrist watch or IC card having a communication module incorporated therein, or the like.

(Modification 11)

The control programs to be used in the tone generation system 100 may be installed in the portable communication terminal 1 and tone generator module 2 in any desired appropriate manner. For example, the control programs to be used may be prestored in a recording medium such as a CDROM (Compact Disk Read-Only Memory) or a floppy disk so that the control programs can be installed in the portable communication terminal 1 and tone generator module 2 via a CDROM drive or the like. Alternatively, the control programs may be installed in the portable communication terminal 1 and tone generator module 2 via so-called network communication using a communication network, such as the Internet, rather than via a recording medium.

In summary, the present invention described in the above-described manner can generate tones of high musical quality and allow every interested user to enjoy a music performance, using a general-purpose communication terminal, such as a portable communication terminal, and a tone generator module.

What is claimed is:

1. A tone generation system comprising a communication terminal including an operator and operable for carrying out communication via a communication network, and a tone generator module, said communication terminal including:
    a mode setting section that is configured to allow a user of the communication terminal to set an operation mode of said communication terminal to either an ordinary mode for causing said communication terminal to operate as an ordinary communication terminal to carry out the communication via the communication network or a music mode for causing said communication terminal to operate as a control terminal to control said tone generator module; and
    a transmission section that, upon actuation of said operator by the user while said communication terminal is in the music mode set by said mode setting section in response to an instruction by the user, transmits, to said tone generator module, a performance signal including actuation time information representative of a time when the actuation, by the user, of said operator has taken place, and content information representative of a musical tone associated with said operator and intended by the user to be generated by the tone generator module, wherein
        said communication terminal and said tone generator module communicate with each other through short-range wireless communication such that the performance signal is converted into a predetermined packet data and transmitted to said tone generator module,
        said tone generator module includes a processing section that, when the performance signal transmitted by said communication terminal has been received, carries out, at a time based on the actuation time information included in the performance signal, a tone generation process for producing said musical tone based on the content information included in the performance signal and said tone generator module generates a tone based on performance information in the predetermined packet data according to the actuation time information,
        said transmission section of said communication terminal transmits, to said tone generator module, the performance signal imparted with reference number information generated in such a manner as to have predetermined regularity with respect to reference number information of a previous performance signal transmitted thereby, and
        when the reference number information of the performance signal received from said communication terminal does not satisfy the predetermined regularity, said processing section of said tone generator module ceases current sounding of a tone.

2. A tone generation system as claimed in claim 1, wherein when said transmission section of said communication terminal has failed in transmission of the performance signal to said tone generator module, said transmission section tries to re-transmit the performance signal to said tone generator module within a predetermined retry period, and when the performance signal can not be transmitted to said tone generator module even within the predetermined retry period, said transmission section discards the performance signal.

3. A tone generation system as claimed in claim 2, wherein said processing section of said tone generator module carries out, at a predetermined time after the time represented by the actuation time information included in the performance signal, said tone generation process based on said content information.

4. A tone generation system as claimed in claim 3, wherein the predetermined time is longer than the predetermined retry period.

5. A tone generation system as claimed in claim 1, wherein said communication terminal and said tone generator module communicate with each other through communication based on a Bluetooth standard, and
    said transmission section of said communication terminal generates the actuation time information on the basis of a clock signal that is generated for communication based on a Bluetooth standard.

6. A tone generation system as claimed in claim 1, wherein said communication terminal includes a plurality of operators, each said operator being associated with a distinct musical note so as to enable the user, through actuation of one or more of said operators, to instruct the tone generation module to produce musical notes of at least one octave.

7. A tone generation system as claimed in claim 6, wherein said communication terminal includes one or more operators for enabling at least a one-octave-down pitch shift and a one-octave-up pitch shift.

8. A tone generation system as claimed in claim 1, wherein said operator is associated with a musical chord.

9. A tone generation system as claimed in claim 1, wherein said tone generator module is external to said communication terminal.

10. A tone generation system as claimed in claim 1, wherein said performance signal is transmitted to said tone generation module on a real-time basis.

11. A tone generation system as claimed in claim 1, wherein said performance signal includes at least a note-on signal and a note-off signal.

12. A communication terminal having an operator comprising:
- a mode setting section that is configured to allow a user of the communication terminal to set an operation mode of said communication terminal to either an ordinary mode for causing said communication terminal to operate as an ordinary communication terminal to carry out communication via a communication network or a music mode for causing said communication terminal to operate as a control terminal to control a tone generator module; and
- a transmission section that, upon actuation of said operator by the user while said communication terminal is in the music mode set by said mode setting section in response to an instruction by the user, transmits, to said tone generator module, a performance signal including actuation time information representative of a time when the actuation, by the user, of said operator has taken place, and content information representative of a musical tone associated with said operator and intended by the user to be generated by the tone generator module wherein
    - said communication terminal and said tone generator module communicate with each other through short-range wireless communication such that the performance signal is converted into a predetermined packet data and transmitted to said tone generator module,
    - said tone generator generates a tone based on performance information in the predetermined packet data according to the actuation time information,
    - said transmission section of said communication terminal transmits, to said tone generator module, the performance signal imparted with reference number information generated in such a manner as to have predetermined regularity with respect to reference number information of a previous performance signal transmitted thereby, and
    - when the reference number information of the performance signal received from said communication terminal does not satisfy the predetermined regularity, said processing section of said tone generator module ceases current sounding of a tone.

13. A communication terminal as claimed in claim 12, further including a plurality of operators, each said operator being associated with a distinct musical note so as to enable the user, through actuation of one or more of said operators, to instruct the tone generation module to produce musical notes of at least one octave.

14. A communication terminal as claimed in claim 13, including one or more operators for enabling at least a one-octave-down pitch shift and a one-octave-up pitch shift.

15. A communication terminal as claimed in claim 12, wherein said operator is associated with a musical chord.

16. A communication terminal as claimed in claim 12, wherein the tone generator module is external to said communication terminal.

17. A tone generation system as claimed in claim 12, wherein said performance signal includes at least a note-on signal and a note-off signal.

18. A tone generator module comprising:
- a reception section that, when an operator of an external communication terminal has been actuated by a user of said communication terminal, receives a performance signal output from said communication terminal, the performance signal including actuation time information representative of a time when the actuation, by the user, of said operator has taken place and content information representative of a musical tone associated with said operator and intended by the user to be generated by the tone generator module; and
- a processing section that, at a time based on the actuation time information included in the performance signal, carries out a tone generation process for producing said musical tone based on the content information included in the performance signal wherein
- said communication terminal and said tone generator module communicate with each other through short-range wireless communication such that the performance signal is converted into a predetermined packet data and transmitted to said tone generator module,
- said tone generator generates a tone based on performance information in the predetermined packet data according to the actuation time information,
- said reception section of said tone generator module receives, from said communication terminal, the performance signal imparted with reference number information generated in such a manner as to have predetermined regularity with respect to reference number information of a previous performance signal received thereby, and
- when the reference number information of the performance signal received from said communication terminal does not satisfy the predetermined regularity, said processing section of said tone generator module ceases current sounding of a tone.

* * * * *